Sept. 14, 1954
T. J. McINTOSH
2,689,155
TOOL HANDLE CONNECTING MEANS
Filed Dec. 7, 1951
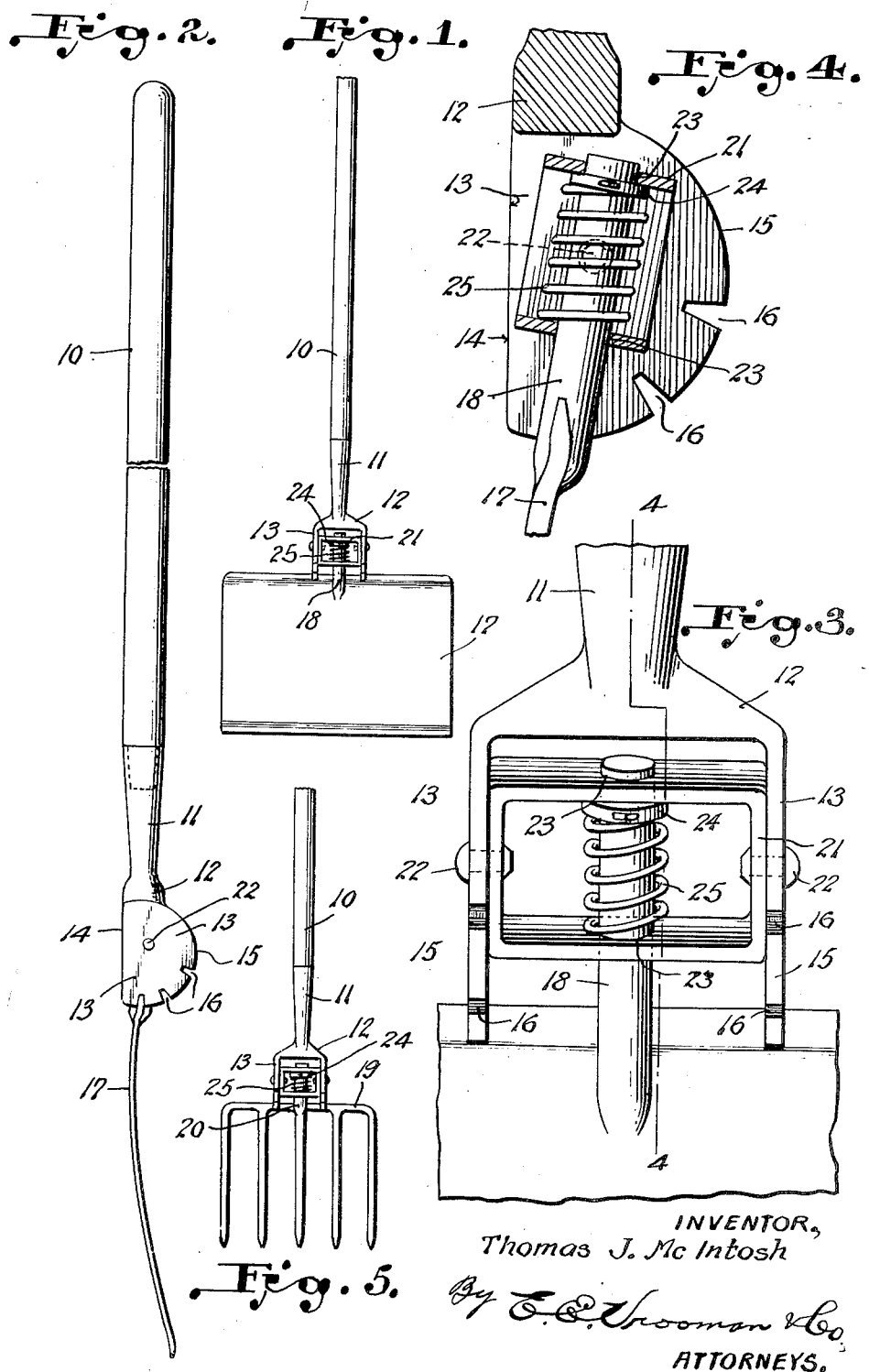
INVENTOR,
Thomas J. McIntosh
ATTORNEYS.

Patented Sept. 14, 1954

2,689,155

UNITED STATES PATENT OFFICE 2,689,155

TOOL HANDLE CONNECTING MEANS

Thomas J. McIntosh, Westville, S. C., assignor of twenty-five per cent to Edgar D. Moore and twenty-five per cent to William A. Dennis, both of Charlotte, N. C.

Application December 7, 1951, Serial No. 260,396

2 Claims. (Cl. 306—13)

This invention relates to agricultural implements and has special reference to a combination hoe, shovel and rake. One important object of the invention is to improve the general construction of devices of this character. A second important object of the invention is to provide a device of this sort having a shiftable head or blade which may be positioned either for digging, raking, or hoeing.

A third important object of the invention is to provide a novel arrangement of latching means to hold the blade of such a device in desired position.

A fourth important object of the invention is to provide a latching means, in a device of this character, which will be protected from injury or clogging during the use of the implement.

With the above and other objects in view, as will be hereinafter apparent, the invention consists in general of certain novel details of construction and combinations of parts hereinafter fully described, illustrated in the accompanying drawings, and particularly claimed.

In the accompanying drawings, like characters of reference indicate like parts in the several views, and Fig. 1 is a front elevation of this invention showing the head and lower part of the handle of the implement.

Fig. 2 is a side elevation of the form of the invention shown in Fig. 1.

Fig. 3 is an enlarged detailed front view of the latching mechanism.

Fig. 4 is a section on the line 4—4 of Fig. 3.

Fig. 5 is a view similar to Fig. 1 but showing a fork head.

In the embodiment of the invention here disclosed, there is provided a handle 10 which fits into a tapered socket 11. This socket is carried on the transverse member 12 of a yoke having spaced parallel arms 13. The arms 13 are of half-moon shape, each having an edge 14 extending parallel to the axis of the socket 11 and an arcuate edge 15. These arcuate edges 15 have notches 16 circumferentially spaced along each edge, the notches on one member 13 being alined opposite those on the other member 13.

The working head of the invention consists, in the form shown in Fig. 1, of a flat of a blade 17 from the center of the upper edge of which projects a shank 18. In the form shown in Fig. 5 the blade 17 is replaced by an ordinary farm fork 19. The fork 19 is likewise provided with a shank 20 extending from its upper edge.

Between the sides 13 of the yoke there is located a rectangular carrier member 21. The sides of the member 21 rest against the yoke sides 13 and are held in position by means of pivot, rivets, or bolts 22. The top and bottom parts of the member 21 are provided with openings 23. The shank 18 or 20 as the case may be, extends through these openings and projects above the top opening. Secured on the shank is a collar 24 forming the seat for the upper end of a coil spring 25 surrounding the shank and resting on the lower transverse portion of the member 21. Now the upper edge of the blade 17 or fork 19 is selectively engageable in the notches 16. When engaged, as in Fig. 2, in the lowest of these notches, the blade 17 will be alined with the handle 17. If the blade is pushed down, compressing the spring 25 the edge of the blade will be freed and the blades may be tilted around to one of the other notches 16. By this means, the blade may be caused to lie at about 45 degrees to the axis of the handle for raking purposes or at right angles to the axis for hoeing. There has thus been provided a simple and efficient device of the kind described and for the purpose specified.

Having thus described the invention, what is claimed is:

1. In an agricultural implement having a handle and a ground engaging blade, means to adjustably connect the blade with said handle comprising a yoke fixed on the lower end of said handle and having parallel lunate arms each provided with an arcuate edge having spaced notches in its periphery, a tiltable support pivotally mounted between said yoke arms said support having parallel side members bearing against the inner sides of the yoke, the pivotal mounting of the support comprising pivots extending through the arms of the yoke and said side members and being located centrally of the arcuate edges of said arms, a work engaging blade carried by said support and having selective notch engagement with said yoke arms, a shank extending from said blade and having guided sliding engagement in said support, and spring means urging said shank upwardly through the support.

2. In an agricultural implement having a handle and a ground engaging blade, means to adjustably connect the blade with said handle comprising a yoke fixed on the lower end of said handle and having parallel lunate arms each provided with an arcuate edge having spaced notches in its periphery, a tiltable support pivotally mounted between said yoke arms said support having parallel side members bearing against the inner sides of the yoke, the pivotal mounting of the support comprising pivots extending through the arms of the yoke and said side members and being located centrally of the arcuate edges of said arms, a work engaging blade carried by said support and having selective notch engagement with said yoke arms, a shank extending from said blade and having guided sliding engagement in said support, said support having spaced transverse members through which the shank passes, said shank having a collar between said transverse members, and a coiled spring surrounding said shank between the collar and the lower transverse member.

References Cited in the file of this patent

UNITED STATES PATENTS

| Number | Name | Date |
|---|---|---|
| 571,900 | Hanstine | Nov. 24, 1896 |
| 1,016,720 | Vondracek | Feb. 6, 1912 |
| 1,156,937 | Sinnott | Oct. 19, 1915 |
| 1,771,325 | Cotter | July 22, 1930 |
| 2,419,719 | Kennedy | Apr. 29, 1947 |
| 2,420,267 | Sefried | May 6, 1947 |

FOREIGN PATENTS

| Number | Country | Date |
|---|---|---|
| 607,729 | Great Britain | Sept. 3, 1948 |